UNITED STATES PATENT OFFICE.

FRÉDÉRIC BELHOMMET, OF BRUSSELS, BELGIUM.

PROCESS OF PRESERVING THE YOLK OF EGGS.

1,024,056.  Specification of Letters Patent.  Patented Apr. 23, 1912.

No Drawing.  Application filed March 16, 1910.  Serial No. 549,674.

*To all whom it may concern:*

Be it known that I, FRÉDÉRIC BELHOMMET, a subject of the King of Belgium, and resident at Brussels, Belgium, have invented certain new and useful Improvements in Processes for Preserving the Yolk of Eggs.

One employs generally for preserving the yolk of eggs which are very rapidly spoiled, a small quantity of boric acid or a large quantity of chlorid of sodium. These products have the great drawback of changing the taste of the yolk of the eggs and to reduce its value by rendering it unsuitable for certain uses; furthermore the yolk thus prepared always contains a certain proportion of white which cannot be removed by mechanical means.

The process which forms the subject matter of this invention preserves the primitive qualities of the yolk while freeing it from the traces of white which it contains. It allows to furnish it to the consumers quite free of any addition. This process consists in adding to the fresh yolk of eggs a small amount of a volatile product which does not attack the yolk but coagulates the white such as for instance chloroform, and in removing this product at the moment of the consumption by a distillation carried out in the vacuum at a low temperature. It will be good to cause the yolk to pass before the distillation through a piece of muslin in order to remove the white and the coagulated germs.

Example: One intimately mixes 100 kg. of fresh yolk of eggs with 2 to 4 kilograms of chloroform and one fills this mixture in ordinary cans which are afterward hermetically closed. The yolk of eggs thus prepared keeps a very long time. In order to render it proper for the consumption, all that is necessary is to filter it as above described and to heat it in a vacuum to about 50° centigrade until the chloroform be entirely expelled therefrom. One replaces the water which has been evaporated at the same time or one adds it before the operation.

The chloroform may be replaced by similar products having a low point of ebullition such as the dichlorethylene and the like.

I claim:

1. A process for preserving the yolk of eggs consisting in adding thereto chloroform to coagulate the white and then bringing said yolk back to its primitive fresh state by expelling said chloroform by means of heat.

2. A process for preserving the yolk of eggs consisting in adding thereto chloroform to coagulate the white and then bringing said yolk back to its primitive fresh state by removing said chloroform by distillation carried out in a vacuum at a low temperature.

3. A process for preserving the yolk of eggs consisting in adding thereto chloroform to coagulate the white and then bringing said yolk back to its primitive fresh state by passing it through a fabric and expelling the chloroform by distillation.

In testimony whereof I have hereunto set my hand in presence of two witnesses.

FRÉDÉRIC BELHOMMET.

Witnesses:
 S. A. GUDLET,
 GREGORY PHELAN.